Aug. 27, 1929.  I. S. SWINT  1,726,167
ANIMAL TRAP
Filed June 8, 1928  2 Sheets-Sheet 1
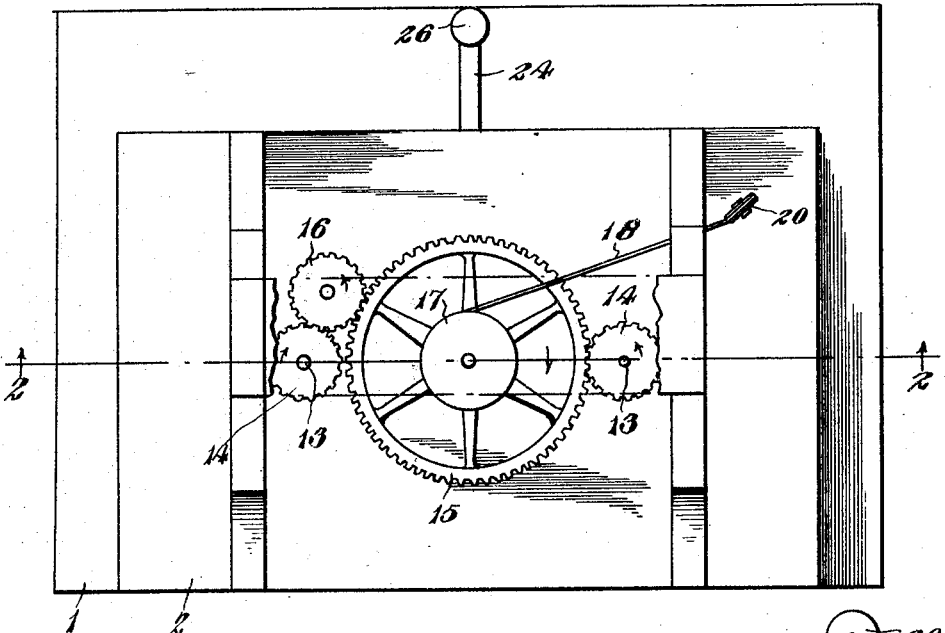
Fig. 1.
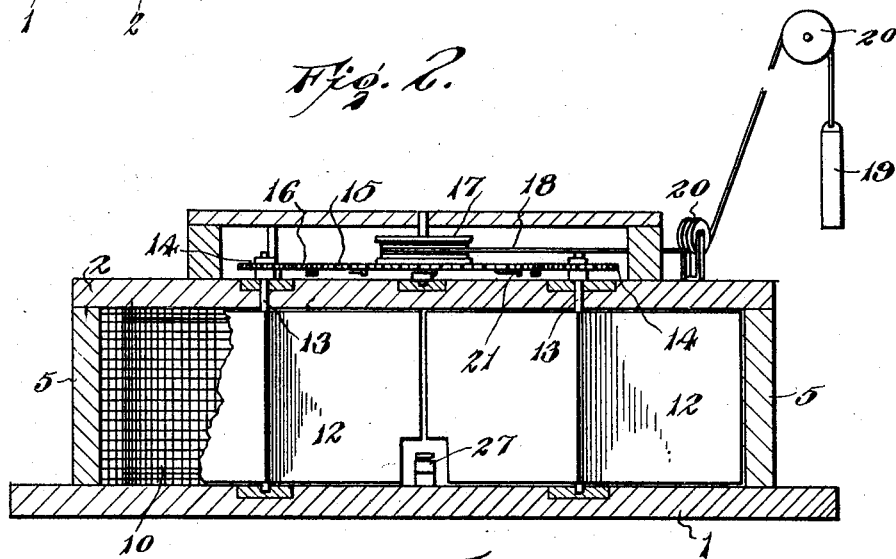
Fig. 2.
Fig. 5.
Inventor
Ida S. Swint
By Lacey & Lacey, Attorneys Aug. 27, 1929.  I. S. SWINT  1,726,167
ANIMAL TRAP
Filed June 8, 1928  2 Sheets-Sheet 2
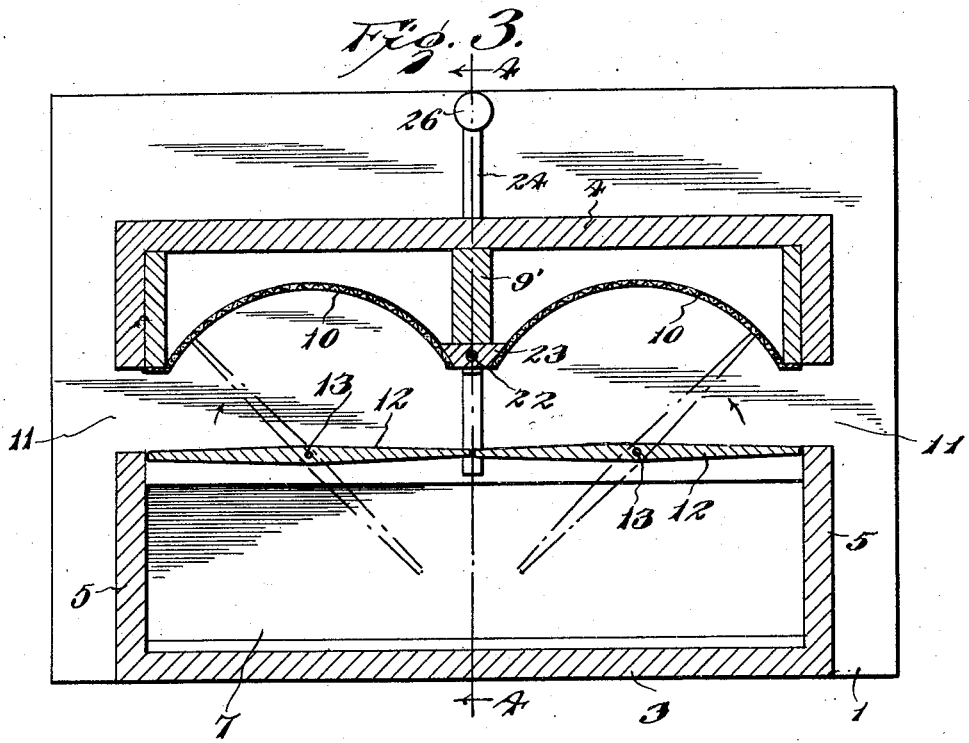
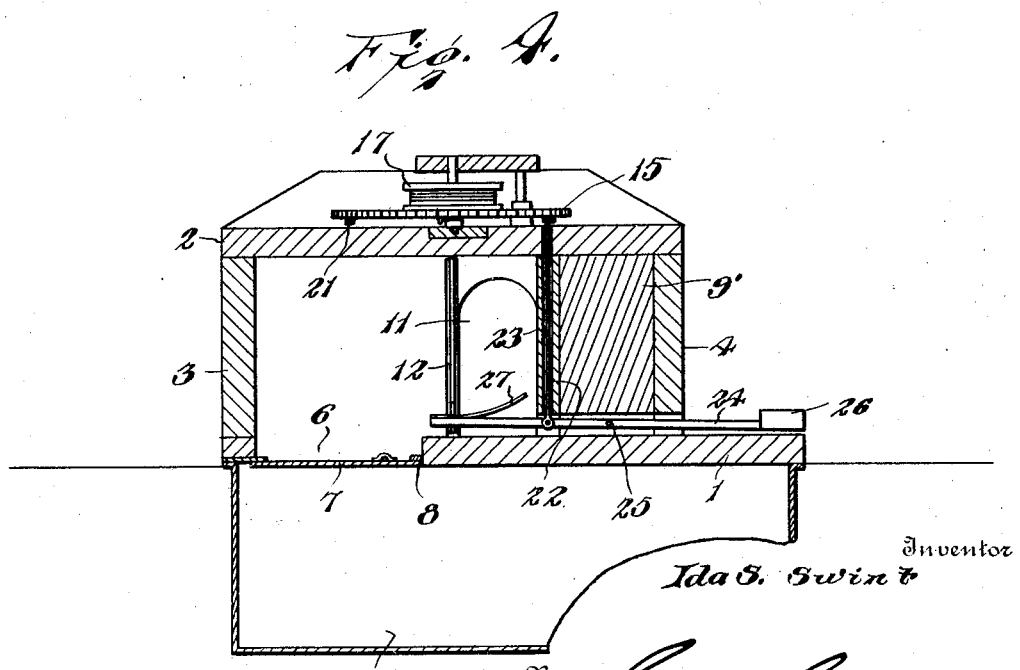
Inventor
Ida S. Swint
By Lacey & Lacey, Attorneys Patented Aug. 27, 1929.

1,726,167

UNITED STATES PATENT OFFICE.

IDA SMILEY SWINT, OF PICKENS, WEST VIRGINIA.

ANIMAL TRAP.

Application filed June 8, 1928. Serial No. 283,953.

The invention relates to a trap for catching animals and provides an article for the purpose stated that is self setting and free from the care and attention required to maintain the average trap in working condition.

The invention provides a trap which may be conveniently positioned and which is set for continuous use, the animals being received in a compartment as entrapped and the trap being automatically set after each operation, so as to ensnare the animals as they enter the device after being attracted thereto.

While the drawing illustrates a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had in the following description and the drawing hereto attached, in which:—

Figure 1 is a top plan view of a trap embodying the invention.

Figure 2 is a vertical sectional view on the line 2—2 of Figure 1, looking in the direction of the arrows.

Figure 3 is a horizontal sectional view of the trap taken on a line below the top thereof.

Figure 4 is a vertical transverse sectional view on the line 4—4 of Figure 3 looking towards the left as designated by the arrows.

Figure 5 is a fragmentary view showing more clearly the detent and cooperating stop.

Corresponding and like parts are referred to in the following description and designated in the several views of the drawings by like reference characters.

The body of the trap comprises a base 1, a top 2, side walls 3 and 4 and end walls 5. The base 1 constitutes the bottom of the trap and is formed in a side portion with an opening 6 in which it fitted a trap door 7 pivoted adjacent its inner edge and free to swing downward at its outer edge. The inner edge portion of the trap door 7 is weighted, as indicated at 8, with the result that the trap door is normally maintained in closed position and is adapted to swing downward at its outer edge under the weight of the entrapped animal and deliver it into a compartment 9 arranged beneath the body of the trap so as to receive and hold the animals as they are ensnared and which are disposed of at various intervals in any determinate way. A partition 9' is disposed at one side of the body adjacent the wall 4. A longitudinal wall 10 connects the partition 9' with the end walls 5 and end portions thereof outwardly. The wall 10 as also the partition 9' extend between the bottom and top of the trap. Openings 11 are formed in the end walls 5 for entrance of the animal. The wall 10 is located at one side of the openings 11. Wings 12 are located at the opposite side of the openings 11 whereby to form a passageway for the entrance of an animal after passing through either one of the openings 11. Each of the wings 12 is pivoted midway of its vertical edges and the wings are of a length to extend from the end walls 5 to a point midway between said end walls. The numeral 13 denotes the vertical axis or pivot of each of the wings 12 and these pivots project above the top 2 of the trap to receive gear wheels 14 which are secured thereto. One of the gear wheels 14 is in mesh with a master gear wheel 15 and the other gear wheel 14 is in mesh with an idle gear wheel 16 which in turn is in mesh with the master gear wheel 15. As a result of this arrangement the wings 12 are adapted to be rotated in reverse direction as indicated by the arrows in Figure 2 of the drawings. The master gear wheel 15 is power driven and as shown a drum 17 is rotatable therewith and a cord 18 wound upon the drum 17 is weighted at one end as indicated at 19 and passes around suitable guide pulleys 20. A plurality of stops 21 carried by the master gear wheel 15 are adapted to coact with a detent 22 to hold the master wheel and wings 12 in normal position. The detent 22 consists of a rod which is loosely mounted in a strip 23 at the narrow vertical edge of the partition 9'. A transversely disposed lever 24 pivoted intermediate its ends as indicated at 25 has the detent 22 pivoted thereto. The outer end of the lever 24 is weighted as indicated at 26 so as to normally hold the detent 22 elevated. The lever 24 constitutes a trigger and is adapted to be tripped by the animal after entering the trap. A spring trip is attached at one end to the inner end of the lever 24 and its opposite end is deflected upwardly to insure positive contact of the animal therewith when attempting to pass over the inner end of the lever. This trip 27 may also serve for attachment of bait to the inner end of the trigger. Bait may also be placed in the space formed between the walls 4 and 10. The passage formed between the wings 12 and the walls 10 may be strewn with bait to attract the animal to be trapped.

The stops 21 are so positioned that when engaged by the detent 22 the wings 12 will aline longitudinally as indicated by the full lines in Figures 2 and 3. When an animal enters the trap through either one of the openings 11 and passes along the passage formed between the wings 12 and wall 10 and comes in contact with the inner end of the trigger 24 the same is depressed thereby withdrawing the detent 22 from the stop 21 and admitting of the master gear wheel 15 rotating under the action of the weighted cord 18. This results in a rotary movement being imparted to the wings 12 whereby their outer ends move inward and their inner ends move outward towards the side wall 3 thereby shutting off all escape and forcing the animal into the space formed over the trap door 7 which trap door swings downwardly and precipitates the animal into the compartment 9. The trap door 7 quickly closes and when the wings 12 have made a one half revolution they are arrested by the detent 22 engaging one of the stops 21 and as a result the trap is automatically set for catching the next animals as will be readily comprehended.

Having thus described the invention, I claim:—

1. A trap comprising a body having entrance openings in opposite ends and a connecting passageway, and having a trap door in its bottom to one side of the passageway, longitudinally alined wings between the passageway and trap door and pivoted intermediate their ends, the wall at the opposite side of the passageway having portions curved concentric with the pivot of the respective wings, means normally tending to rotate the wings to move their outer ends inwardly, a detent, and a trigger for releasing the detent said trigger extending beyond the meeting ends of the wings for disposition within the passageway.

2. An animal trap comprising a body having entrance openings in opposite ends and a connecting passageway, and having a trap door in its bottom to one side of the passageway, wings between the passageway and trap door and pivoted intermediate their ends, a master gear wheel, means normally tending to rotate the master gear wheel, gears between the master gear wheel and the wings to effect reverse rotation of the latter, stops on the master gear wheel, a detent to coact with the stops, to restrain rotation of the master gear wheel, and a trigger for operating the detent.

In testimony whereof I affix my signature.

IDA SMILEY SWINT. [L. S.]